US009516191B2

(12) United States Patent
Fukushima

(10) Patent No.: US 9,516,191 B2
(45) Date of Patent: Dec. 6, 2016

(54) IMAGE PROCESSING APPARATUS, CONTROL METHOD THEREOF, AND STORAGE MEDIUM

(75) Inventor: Kenta Fukushima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 13/232,747

(22) Filed: Sep. 14, 2011

(65) Prior Publication Data
US 2012/0079064 A1  Mar. 29, 2012

(30) Foreign Application Priority Data

Sep. 27, 2010 (JP) ................................ 2010-215664

(51) Int. Cl.
G06F 15/16 (2006.01)
H04N 1/32 (2006.01)
H04W 24/08 (2009.01)
H04W 4/00 (2009.01)
(Continued)

(52) U.S. Cl.
CPC .......... *H04N 1/324* (2013.01); *H04N 1/00244* (2013.01); *H04N 1/00973* (2013.01); *H04N 1/32085* (2013.01); *H04N 1/32096* (2013.01); *H04N 1/32614* (2013.01); *H04N 1/32641* (2013.01); *H04N 1/32651* (2013.01); *H04N 1/32694* (2013.01); *H04W 4/005* (2013.01); *H04W 24/08* (2013.01); *H04W 72/0406* (2013.01); *H04N 2201/0039* (2013.01); *H04N 2201/0094* (2013.01)

(58) Field of Classification Search
CPC .. H04W 24/08; H04W 4/005; H04W 72/0406; H04N 1/324
USPC .................................. 709/217–219, 223–225
See application file for complete search history.

(56) References Cited

U.S. PATENT DOCUMENTS

2005/0130596 A1* 6/2005 Naick et al. ............... 455/67.11
2008/0080012 A1* 4/2008 Mock et al. ................. 358/402
2008/0126499 A1* 5/2008 Rowley ........................ 709/208
(Continued)

FOREIGN PATENT DOCUMENTS

CN         1929929 A    3/2007
CN      101448058 A    6/2009
(Continued)

*Primary Examiner* — John B Walsh
*Assistant Examiner* — Weiwei Stiltner
(74) *Attorney, Agent, or Firm* — Canon USA, Inc. IP Division

(57) ABSTRACT

An image processing apparatus capable of communicating with an external apparatus via a network registers a transfer setting containing an ID for identifying destination information stored in the external apparatus to transfer received image data, acquires the destination information corresponding to the ID contained in the registered transfer setting from the external apparatus, and transfers the received image data using the acquired destination information. When the destination information cannot be acquired, a cause why the destination information cannot be acquired is determined, and if the cause why the destination information cannot be acquired is due to a communication error with the external apparatus, the registered transfer setting is not invalidated and when the cause why the destination information cannot be acquired is that no destination information corresponding to the ID is stored by the external apparatus, the registered transfer setting is invalidated.

13 Claims, 9 Drawing Sheets

(51) Int. Cl.
*H04W 72/04* (2009.01)
*H04N 1/00* (2006.01)

(56) References Cited

U.S. PATENT DOCUMENTS

| | | | |
|---|---|---|---|
| 2008/0275950 A1* | 11/2008 | Jordan | 709/203 |
| 2009/0003312 A1* | 1/2009 | Velazquez et al. | 370/352 |
| 2009/0113011 A1 | 4/2009 | Kuribara | |
| 2009/0298489 A1* | 12/2009 | Chitturi et al. | 455/418 |
| 2010/0002255 A1 | 1/2010 | Fukushima | |
| 2011/0022723 A1* | 1/2011 | Inoue | H04N 1/32411 709/238 |

FOREIGN PATENT DOCUMENTS

| JP | H05-298125 A | 11/1993 |
|---|---|---|
| JP | 2000-354128 A | 12/2000 |
| JP | 2002-024181 A | 1/2002 |
| JP | 2002-077472 A | 3/2002 |
| JP | 2002077472 * | 3/2002 |
| JP | 2005-210547 * | 8/2005 |
| JP | 2005-217879 A | 8/2005 |
| JP | 4439699 B2 | 3/2010 |

\* cited by examiner

FIG. 6

| TRANSFER SETTING ID | TRANSFER CONDITION | TRANSFER DESTINATION | VALID FLAG |
|---|---|---|---|
| 0001 | FAX RECEPTION | 0001 | ON |
| 0002 | E-mail RECEPTION | 0002 | ON |
| 0003 | FAX RECEPTION FROM 03-3333-3333 | 0003 | OFF |

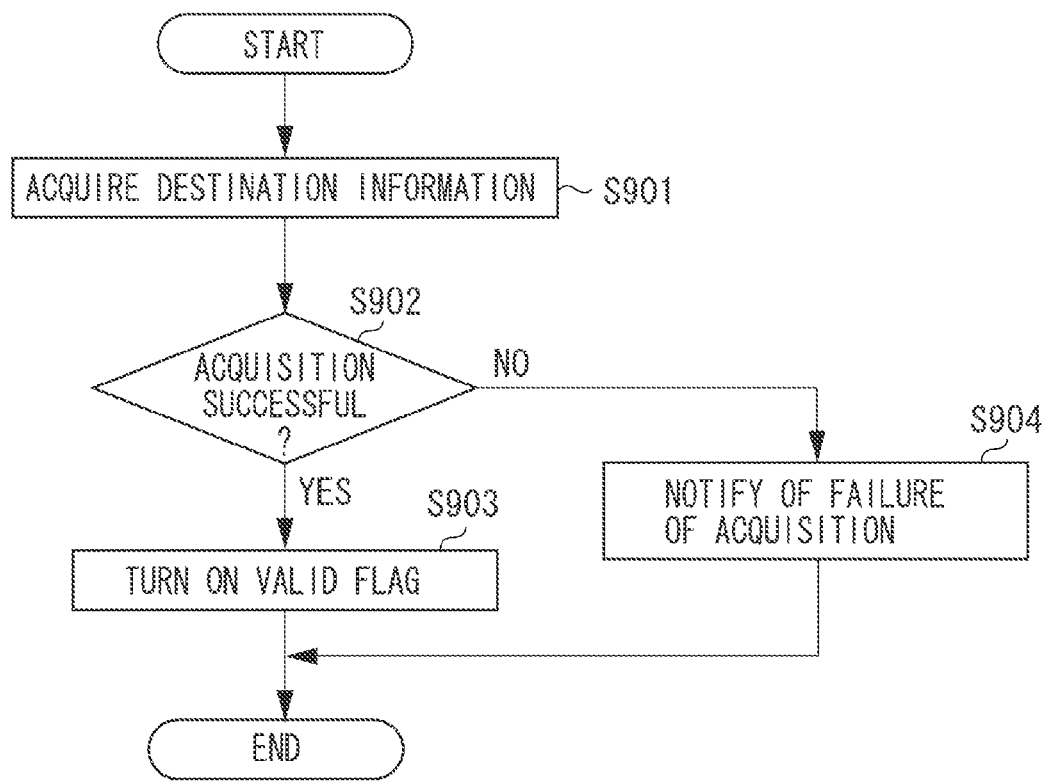

IMAGE PROCESSING APPARATUS, CONTROL METHOD THEREOF, AND STORAGE MEDIUM

BACKGROUND OF THE INVENTION

1. Field of the Invention

The present invention relates to an image processing apparatus capable of communicating with an external apparatus via a network to acquire destination information from the external apparatus.

2. Description of the Related Art

Conventionally, an image processing apparatus such as a multi-function peripheral can transfer received image data to another apparatus. To automatically transfer the received image data, it is necessary to previously register a transfer setting including a transfer condition for determining whether the received image data is to be transferred, and destination information indicating a transfer destination. Registering the transfer setting enables the image data to be automatically transferred using the destination information contained in the transfer setting when the image processing apparatus receives the image data satisfying the transfer condition.

Various types of transmission protocols such as facsimile (FAX), E-mail, a file transfer protocol (FTP), and a server message block (SMB) are available to transfer image data. The transfer destination of the image data is specified using the destination information corresponding to each transmission protocol. For example, when the image data is transferred using a facsimile, a telephone number is used as the destination information and when the image data is transferred via E-mail, an E-mail address is used as the destination information.

Instead of directly registering the destination information such as a telephone number and an E-mail address in the transfer setting, a method for registering an identification (ID) corresponding to destination information registered in an address book as the transfer setting has been known. In this case, when an image processing apparatus receives image data satisfying a transfer condition, it acquires destination information corresponding to the ID contained in the transfer setting from the address book and then transfers the image data.

Japanese Patent Application Laid-Open No. 2002-077472 discusses a method for, when the destination information registered in the address book is deleted, invalidating the transfer setting containing ID corresponding to the deleted destination information. Consequently, this can prevent waste processing of attempting to acquire destination information corresponding to the ID each time when the image data satisfying the transfer condition is received when the destination information has been already deleted from the address book.

Recently, instead of referring to the address book in the image processing apparatus, the image processing apparatus can refer to an address book in an external apparatus which can communicate with via a network and acquire destination information from the external apparatus, as discussed in Japanese Patent Application Laid-Open No. 2002-077472. In this case, because a plurality of the image processing apparatuses can refer to the address book of an external apparatus, labor and time required for an administrator to update the address book can be reduced.

However, if a configuration for acquiring the destination information from the external apparatus is adopted, there is a possibility that an operator cannot know that the destination information stored in the external apparatus has been deleted immediately and thus the destination information is left as it is in a state in which its transfer setting is valid even after the destination information has been deleted. Additionally, if the image processing apparatus is configured to equally invalidate all the transfer settings when the image processing apparatus cannot acquire the destination information, all the transfer settings might be invalidated, even if the destination information cannot be acquired due to a temporary communication error, such as a network failure and server busy status, and acquisition of the destination information is restored after a time passes.

SUMMARY OF THE INVENTION

The present invention is directed to a mechanism that, if no destination information can be acquired, can change whether a transfer setting is invalidated or not according to a cause why the destination information cannot be acquired.

According to an aspect of the present invention, an image processing apparatus capable of communicating with an external apparatus via a network includes a receiving unit configured to receive image data, a registering unit configured to register a transfer setting containing an ID for identifying destination information stored in the external apparatus to transfer the image data received by the receiving unit, an acquisition unit configured to acquire the destination information corresponding to the ID contained in the transfer setting registered by the registering unit from the external apparatus, a transfer unit configured to transfer the image data received by the receiving unit using the destination information acquired by the acquisition unit, a determining unit configured to, in a case where the acquisition unit cannot acquire the destination information, determine the cause of not being able to acquire the destination information, and a control unit configured to refrain from invalidating the transfer setting registered by the registering unit when the determined cause is due to a communication error with the external apparatus, and to invalidate the transfer setting registered by the registering unit when the determined cause is that no destination information corresponding to the ID is stored in the external apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a transfer setting management table according to the exemplary embodiment of the present invention.

FIG. 9 is a flowchart illustrating the operation of the MFP according to the exemplary embodiment of the present invention.

DESCRIPTION OF THE EMBODIMENTS

Various exemplary embodiments, features, and aspects of the invention will be described in detail below with reference to the drawings.

Note that not all combinations of features described in the exemplary embodiments below are necessary for providing a solution according to the present invention.

Figure 1:
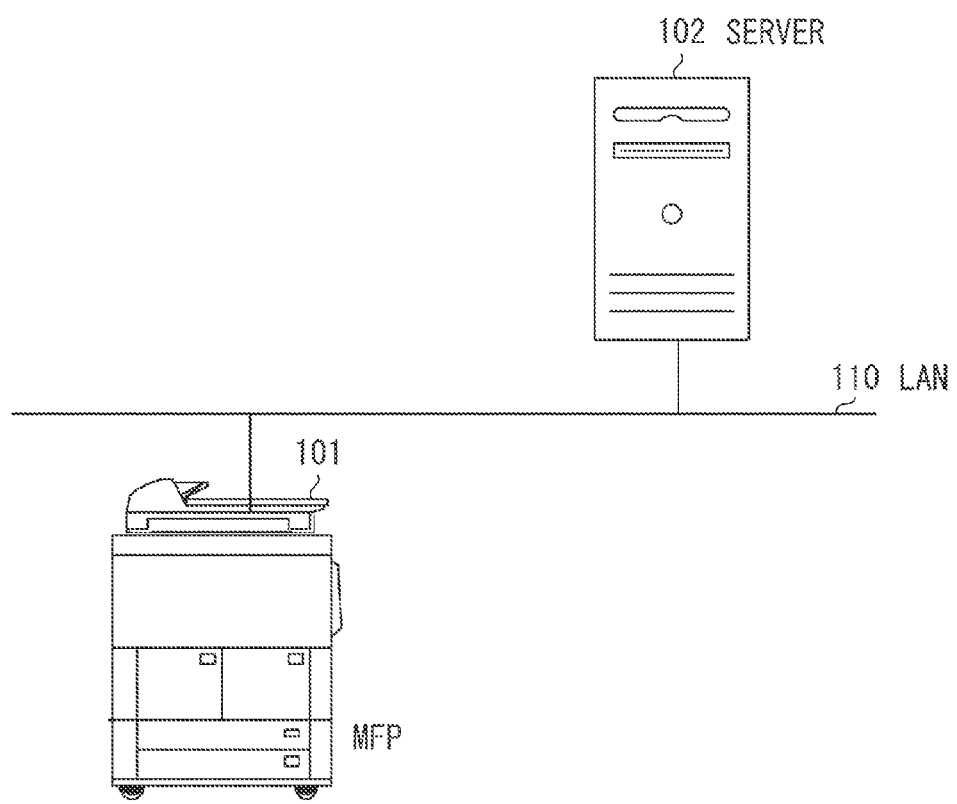
FIG. 1 is an entire system view of an exemplary embodiment of the present invention.

FIG. 1 is an overview of a system of the present exemplary embodiment. An MFP 101 as an image processing apparatus and a server 102 as an external apparatus are connected to a local area network (LAN) 110 such that they can communicate with each other. The server 102 stores a destination information management table 400 which will be described in detail below and the MFP 101 can acquire the destination information via access to the destination information management table 400 in the server 102.

Figure 2:
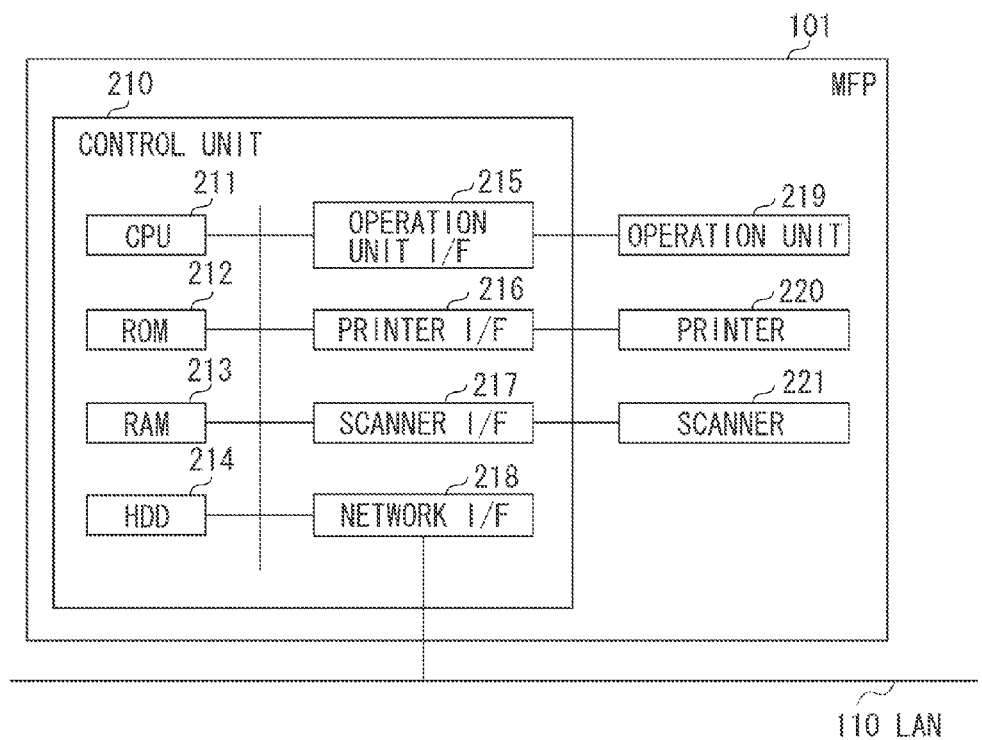
FIG. 2 is a block diagram illustrating a configuration of an MFP according to the exemplary embodiment of the present invention.

FIG. 2 is a block diagram illustrating the configuration of the MFP 101. A control unit 210 includes a central processing unit (CPU) 211 and controls the operation of the MFP 101. The CPU 211 reads a control program stored in a read-only memory (ROM) 212 and executes various types of control, such as reading control and transmission control. Thus, the MFP 101 can provide various services such as copying, scanning (transmission), and printing. A random access memory (RAM) 213 is used as a temporary storage area such as a main memory and a work area of the CPU 211.

A hard disk drive (HDD) 214 stores image data and various programs, a transfer setting management table 600, which will be described below, and another table (internal address book) similar to the destination information management table 400, which will be described below. An operation unit interface (I/F) 215 connects an operation unit 219 to the control unit 210. The operation unit 219 includes a liquid crystal display unit having a touch-panel function and a keyboard.

A printer I/F 216 connects a printer 220 to the control unit 210. Image data to be printed by the printer 220 is transferred from the control unit 210 via the printer I/F 216 and printed on a recording medium by the printer 220.

A scanner I/F 217 connects a scanner 221 to the control unit 210. The scanner 221 reads an image on a document to generate image data and inputs the image data into the control unit 210 via the scanner I/F 217.

A network I/F 218 connects the control unit 210 (MFP 101) to the LAN 110. The network I/F 218 transmits image data and information to an external apparatus (e.g., the server 102) on the LAN 110 and receives various pieces of information from the external apparatus on the LAN 110. The MFP 101 can transmit an E-mail to a mail server (not shown) on the LAN 110 from the network I/F 218.

The MFP 101 can be equipped with a facsimile function via a modem (not shown), which is optionally available. When the facsimile function is added, the MFP 101 can execute facsimile transmission via a public line network to transmit and receive image data to/from other facsimile devices.

Figure 3:
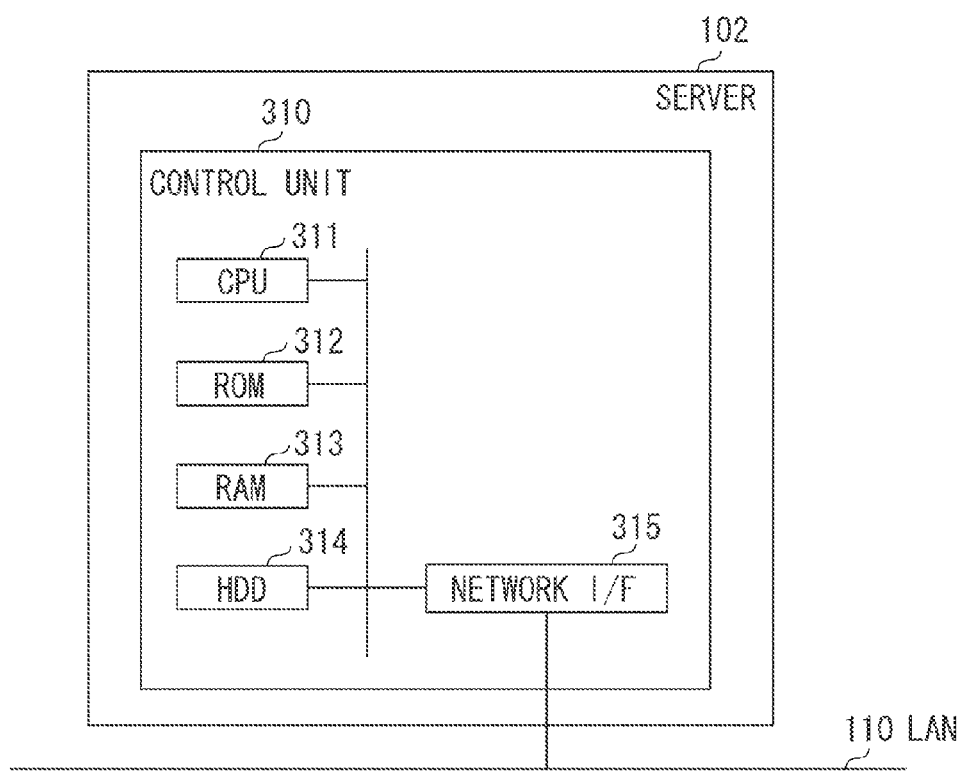
FIG. 3 is a block diagram illustrating a configuration of a server according to the exemplary embodiment of the present invention.

FIG. 3 is a block diagram illustrating the configuration of the server 102. A control unit 310 includes a CPU 311 and controls the operation of the server 102. The CPU 311 reads a control program stored in a ROM 312 and executes various types of control processing. A RAM 313 is used as a temporary storage area such as a work area for a main memory and a work area of the CPU 311. An HDD 314 stores image data, various programs and the destination information management table (external address book) 400, which will be described below.

A network I/F 315 connects the control unit 310 (server 102) to the LAN 110. The network I/F 315 transmits and receives various pieces of information from/to other apparatuses via the LAN 110.

Figure 4:
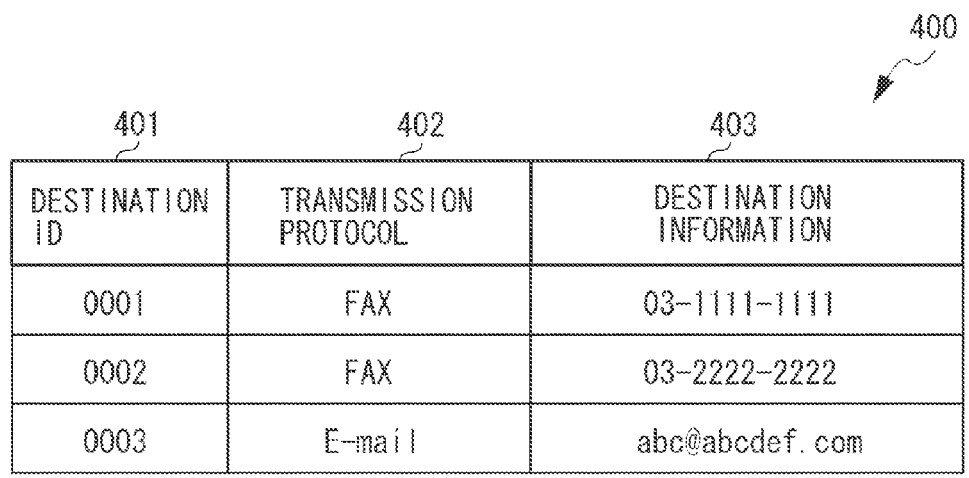
FIG. 4 illustrates a destination information management table according to the exemplary embodiment of the present invention.

FIG. 4 illustrates the destination information management table (external address book) 400 stored by the HDD 314 in the server 102. A destination information management table (internal address book) configured in the similar manner to the destination information management table 400 is stored in the HDD 214 of the MFP 101.

A destination ID 401 is an ID which uniquely identifies destination information managed in the destination information management table 400. A transmission protocol 402 indicates a transmission protocol corresponding to each destination information. Destination information 403 is information indicating a destination. When a FAX is specified as the transmission protocol 402, a telephone number is stored in the destination information 403. For example, when E-mail is specified as the transmission protocol 402, an E-mail address is stored in the destination information 403.

Although in some embodiments the destination ID 401 is set up to uniquely identify only the destination information managed in the destination information management table 400 in the server 102, it may further be set up to uniquely identify the destination information on the entire LAN 110 by being combined with a name of the server 102 or an internet protocol (IP) address of the server 102.

An apparatus (including the MFP 101) located on the LAN 110 can refer to the destination information management table 400 using a general-purpose protocol such as a lightweight directory access protocol (LDAP) or vendor-specified protocol.

Figure 5:
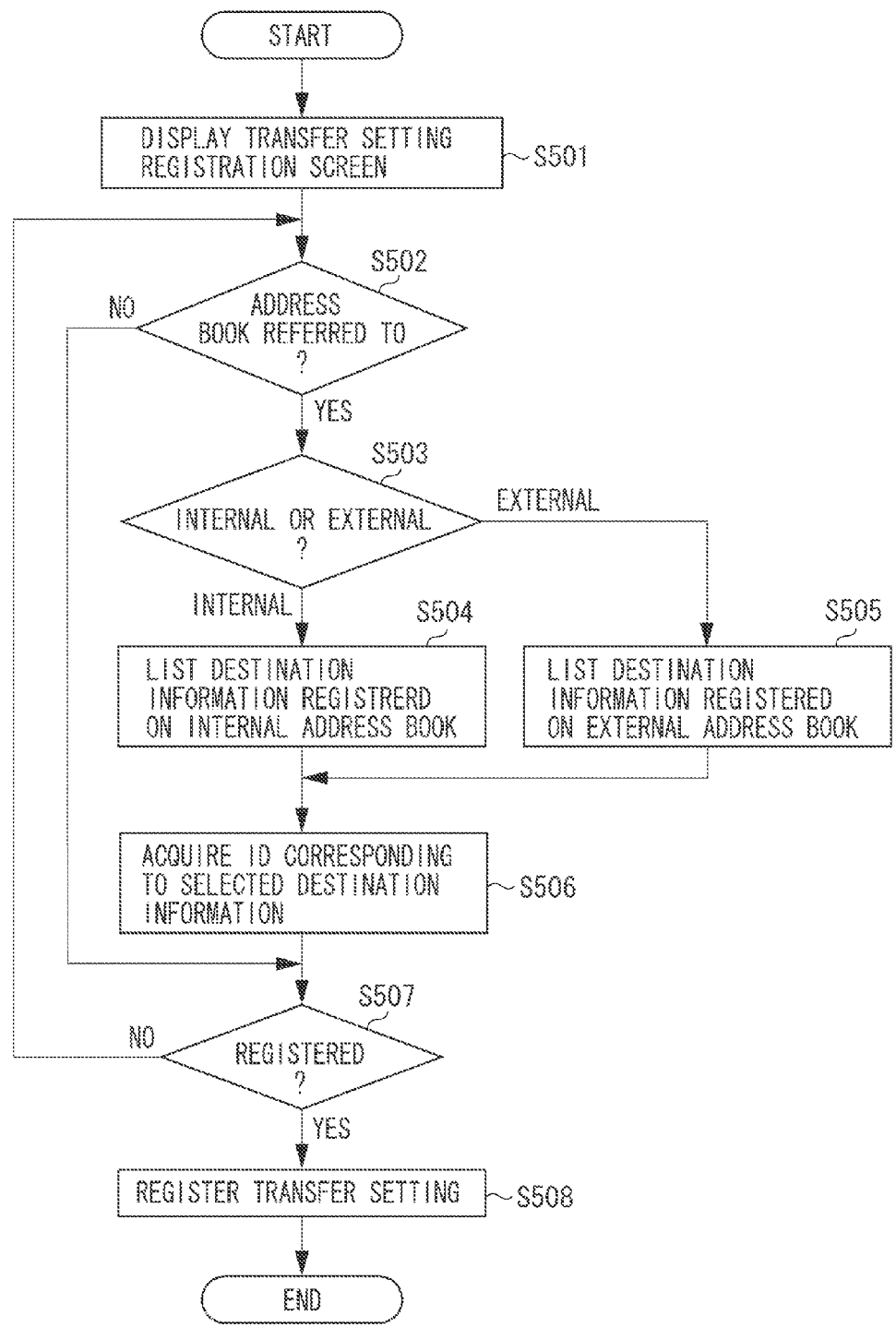
FIG. 5 is a flowchart illustrating an operation of the MFP according to the exemplary embodiment of the present invention.

FIG. 5 is a flowchart illustrating a series of operations for registering a transfer setting according to an instruction from a user in the MFP 101. Each operation (step) illustrated in the flowchart in FIG. 5 is achieved when the CPU 211 of the MFP 101 executes a control program stored in the HDD 214.

In step S501, the CPU displays a transfer setting registration screen on the operation unit 219 according to the instruction of the user. The user inputs a transfer condition for determining whether received image data is transferred and selects a transfer destination for the image data via the transfer setting registration screen. If the transfer setting is registered via the transfer setting registration screen, when image data satisfying the transfer condition is received, the image data is automatically transferred to the transfer destination selected in advance.

In step S502, the CPU 211 determines whether the user instructs reference to an address book. If reference to the address book is instructed (YES in step S502), the procedure proceeds to step S503 and otherwise (NO in step S502), the procedure proceeds to step S507. As described above, the transfer setting registration screen allows an input of the transfer setting condition as well as selection of the transfer destination. Only the selection of the transfer destination will be described in detail here.

In step S503, the CPU 211 determines whether the address book to be referred to is an internal address book or an external address book. In the present example, the transfer destination to be set as the transfer setting needs to be specified by referring to the address book, and directly specifying the destination information without referring to the address book is prohibited.

As a result of determination in step S503, if the address book referred to is the internal address book (INTERNAL in step S503), the procedure proceeds to step S504. In step S504, the destination information management table stored in the HDD 214 of MFP 101 is referred to and then registered destination information is displayed as a list. On the other hand, if the address book referred to is the external address book (EXTERNAL in step S503), the procedure proceeds to step S505. In step S505, the destination information management table stored in the HDD 314 of the server 102 is referred to and then registered destination information is displayed as a list.

In step S506, the destination ID is acquired (401 in FIG. 4) corresponding to the destination information selected from the destination information listed in step S504 or S505 by the user.

In step S507, the CPU 211 determines whether a registration button on the transfer setting registration screen is pressed. As a result of the determination, if it is determined that the registration button is pressed (YES in step S507), the procedure proceeds to step S508. In step S508, a content input via the transfer setting registration screen is registered on the transfer setting management table 600, which will be described below, as a transfer setting. If it is determined that the registration button is not pressed (NO in step S507), the procedure returns to step S502.

FIG. 6 illustrates the transfer setting management table 600 stored in the HDD 214 of the MFP 101. A transfer setting ID 601 is an ID which uniquely identifies the transfer setting managed in the transfer setting management table 600.

A transfer condition 602 indicates a condition for determining whether received image data is transferred. For example, in the case of the transfer setting ID 601 of "0003", when a facsimile of image data is received from a transmission source at a telephone number 03-3333-3333, the received image data is set to be automatically transferred.

A transfer destination 603 indicates a transfer destination of the image data. As illustrated in the drawing, the transfer destination 603 stores not the destination information such as a telephone number or an E-mail address as it is, but the destination ID (401 in FIG. 4) assigned to identify the destination information in the address book. When the image data is actually transferred, the destination information corresponding to the destination ID is acquired from the address book using the destination ID stored in the transfer destination 603.

A valid flag 604 indicates whether each transfer setting managed in the transfer setting management table 600 is valid or invalid. When the valid flag 604 is ON, the transfer setting is valid, so that transfer of the image data is executed. On the other hand, when the valid flag 604 is OFF, the transfer setting is invalid and even if the image data satisfying the transfer condition is received, transfer of the image data is not executed. The user can change manually whether each transfer setting is valid or not, as required.

Figure 7:
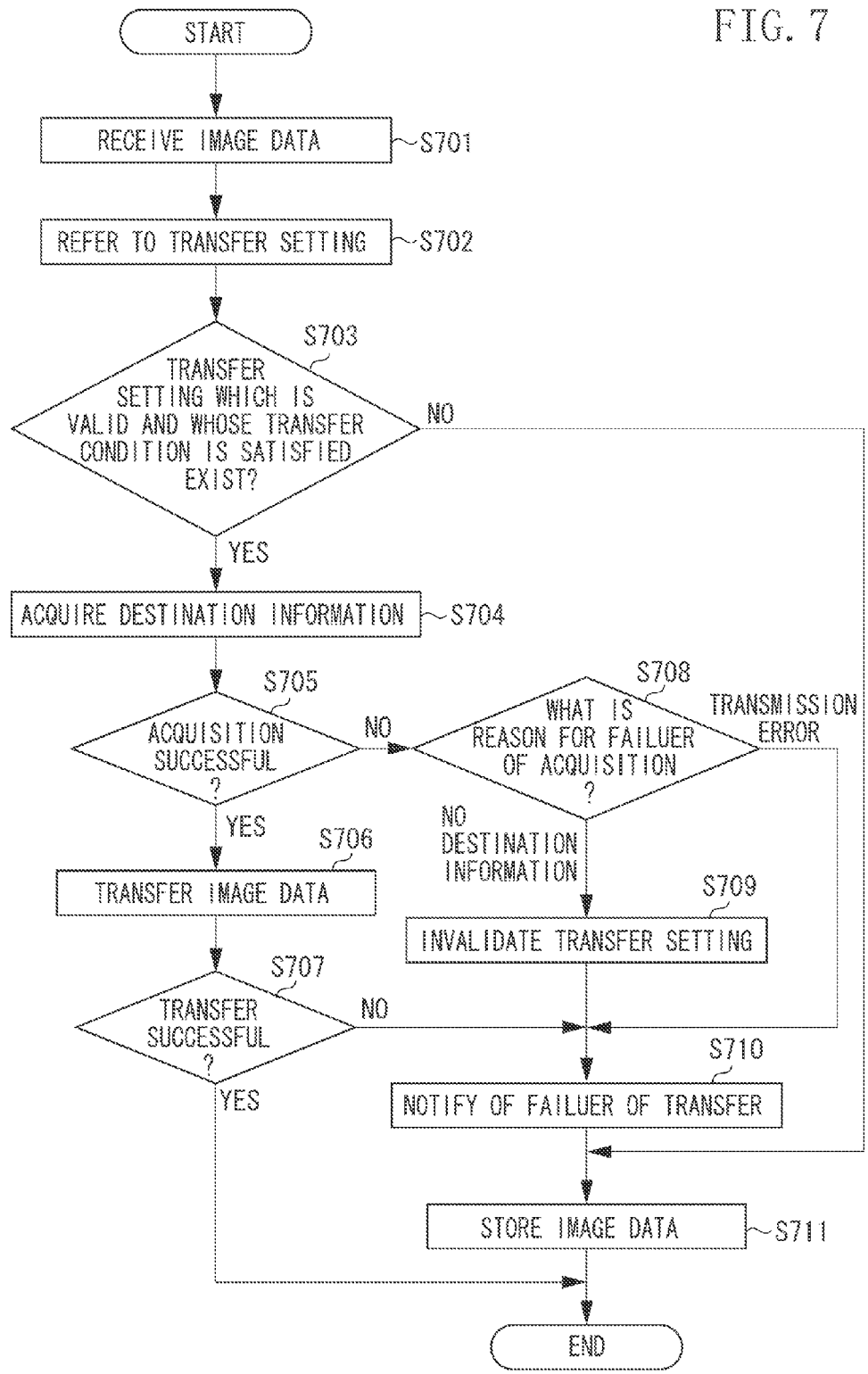
FIG. 7 is a flowchart illustrating an operation of the MFP according to the exemplary embodiment of the present invention.

FIG. 7 is a flowchart illustrating a series of operations when the MFP 101 receives the image data. Each operation (step) illustrated in the flowchart in FIG. 7 is achieved when the CPU 211 of the MFP 101 executes a control program stored in the HDD 214.

In step S701, the MFP 101 receives image data. When receiving the image data, the MFP 101 may use any one of E-mail and facsimile transmission. If the image data is received in step S701, the procedure proceeds to step S702, in which the CPU 211 accesses the transfer setting management table 600 to refer to the registered transfer settings.

In step S703, the CPU 211 determines whether there exists any transfer setting for which the valid flag 604 is ON and the image data received in step S701 satisfies the transfer condition 602. As a result of the determination, if there is any transfer setting corresponding to the above described condition (YES in step S703), the procedure proceeds to step S704 and otherwise (NO in step S703), the procedure proceeds to step S711.

In step S704, the CPU 211 acquires the destination information corresponding to the destination ID using the destination ID contained in the transfer setting. If the corresponding destination information is managed in the destination information management table 400 in the server 102, the MFP 101 acquires the destination information by communicating with the server 102 via the LAN 110.

In step S705, the CPU 211 determines whether acquisition of the destination information in step S704 is successful. If it is determined that the acquisition of the destination information is successful (YES in step S705), the procedure proceeds to step S706. If the acquisition of the destination information fails (NO in step S705), the procedure proceeds to step S708.

If the destination information corresponding to the destination ID contained in the transfer setting is stored in the HDD 214 of the MFP 101, processing in step S705 may be omitted. This is appropriate in embodiments where the MFP 101 is adapted to, when the destination information is deleted from the destination information management table stored in the HDD 214, automatically invalidate the transfer setting (valid flag 604 turned off) including the destination ID corresponding to the deleted destination information.

Due to this function, if the HDD 214 in the MFP 101 stores the destination information corresponding to the destination ID contained in the transfer setting, the acquisition of the destination information never fails. Therefore, after step S704, the procedure proceeds to step S706 while omitting step S705.

In step S706, the image data received in step S701 is transferred using the destination information acquired in step S704.

In step S707, the CPU 211 determines whether the transfer in step S706 is successful. If it is determined that the transfer is successful (YES in step S707), the processing is terminated. If the transfer fails (NO in step S707), the procedure proceeds to step S710.

In step S708, the CPU 211 determines the cause for the failure of the acquisition of the destination information in step S704. If the destination information corresponding to the destination ID contained in the transfer setting is stored in the HDD 314 of the server 102, the acquisition of the destination information may fail due to occurrence of a network failure on the LAN 110 or a busy status of the server 102.

In step S708, if a response from the server 102 to a destination information acquisition request from the MFP 101 indicates that no relevant destination information exists (NO DESTINATION INFORMATION in step S708), the procedure advances to step S709. A case where no relevant destination information exists is, for example, considered to be a case where the destination information is deleted from the destination information management table 400 in the server 102 after the transfer setting is registered. If the destination information is deleted in the server 102, the MFP 101 cannot know immediately that the destination information is deleted, different from the case where the destination information is deleted in the MFP 101.

In step S709, the valid flag 604 for the transfer setting is turned OFF. Consequently, this can prevent execution of waste processing of, with the transfer setting left in the valid state although the destination information does not exist, attempting to acquire the destination information each time when image data satisfying the transfer condition is received.

On the other hand, if no response is received from the server 102 to the destination information acquisition request from the MFP 101 or a server-busy response is received, the failure of the acquisition of the destination is considered to originate from a communication error with the server 102 (TRANSMISSION ERROR in step S708), and then, the procedure proceeds to step S710. In this case, processing of invalidating the transfer setting in step S709 is not executed.

In step S710, the operation unit 219 displays a message which notifies the user that the transfer of image data fails. In step S711, the image data received in step S701 is stored in a preliminarily specified storage area in the HDD 214. In step S711, the image data may be printed by the printer 220 instead of being stored into the HDD 214.

According to the above-described processing, if the acquisition of the destination information from the server 102 fails, whether or not the transfer setting is invalidated is determined according to the cause for the failure of the acquisition. More specifically, if the acquisition of the destination information is temporarily disabled due to a communication error, it is expected that the acquisition of the destination information will be restored after a time passes. Thus, the transfer setting is maintained in a valid state without being invalidated.

On the other hand, if the acquisition of the destination information fails due to inexistence of the destination information (not being stored) in the server 102, it cannot be expected that the acquisition of the destination information will be restored even after a time passes. Thus, the transfer setting is invalidated.

Figure 8:
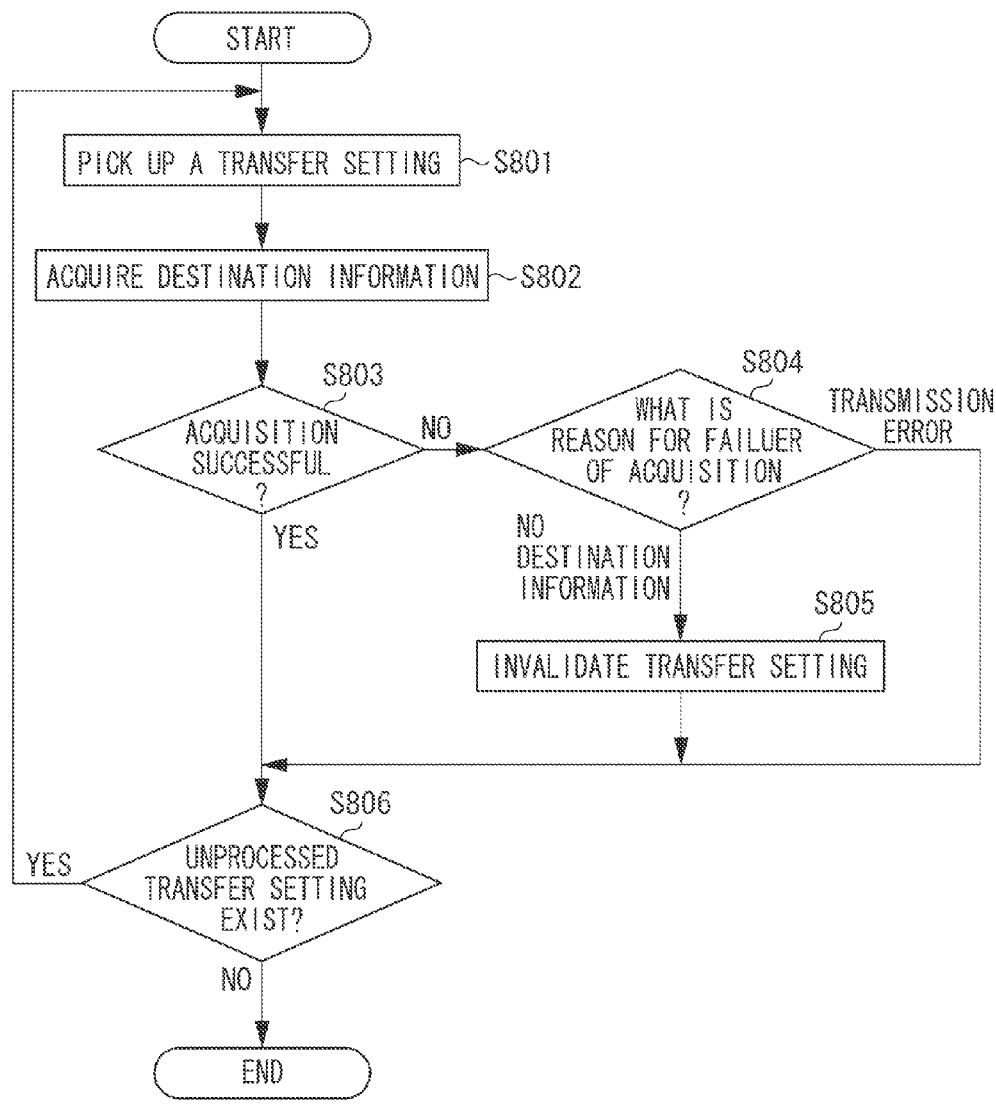
FIG. 8 is a flowchart illustrating an operation of the MFP according to the exemplary embodiment of the present invention.

FIG. 8 is a flowchart illustrating a series of operations executed before image data is received (irrespective of whether the image data is received) in the MFP 101. Each operation (step) illustrated in the flowchart in FIG. 8 is achieved when the CPU 211 of the MFP 101 executes a control program stored in the HDD 214.

The processing illustrated in the flowchart in FIG. 8 may be started periodically (every specified time) or when a list of registered transfer settings is displayed or a specific transfer setting is displayed in detail.

In step S801, the CPU 211 picks up a transfer setting from the transfer setting management table 600. Only a transfer setting for which the valid flag 604 is ON is taken as a target object and the transfer setting whose valid flag 604 is OFF is not treated as a target object.

In step S802, by using the destination ID contained in the transfer setting picked up in step S801, destination information corresponding to the relevant destination ID is acquired. If the corresponding destination information is managed in the destination information management table 400, the MFP 101 acquires the destination information by communicating with the server 102 via the LAN 110.

In step S803, the CPU 211 determines whether the acquisition of the destination information in step S802 is successful. If the acquisition of the destination information is successful (YES in step S803), the acquired destination information is discarded and then the procedure proceeds to step S806. If the acquisition of the destination information fails (NO in step S803), the procedure proceeds to step S804.

If the destination information corresponding to the destination ID contained in the transfer setting is stored in the HDD 214 of the MFP 101, the processing in steps S802 and S803 may be omitted. This is appropriate in embodiments where the MFP 101 is adapted to, when the destination information is deleted from the destination information management table stored in the HDD 214, automatically invalidate the transfer setting including the destination ID corresponding to the deleted destination information.

Due to this function, if the HDD 214 in the MFP 101 stores the destination information corresponding to the destination ID contained in the transfer setting, the acquisition of the destination information never fails. Therefore, after step S801, the procedure proceeds to step S806 while omitting steps S802 and 803.

In step S804, the CPU 211 determines the cause for the failure of the acquisition of the destination information in step S801. If the destination information corresponding to the destination ID contained in the transfer setting is stored in the HDD 314 of the server 102, the acquisition of the destination information may fail due to occurrence of a network failure on the LAN 110 or a busy status of the server 102.

In step S804, if a response from the server 102 to a destination information acquisition request from the MFP 101 indicates that no relevant destination information exists (NO DESTINATION INFORMATION in step S804), the procedure proceeds to step S805. A case where no relevant destination information exists is, for example, considered to be a case where the destination information is deleted from the destination information management table 400 in the server 102 after the transfer setting is registered. If the destination information is deleted in the server 102, the MFP 101 cannot know immediately that the destination information is deleted, different from the case where the destination information is deleted in the MFP 101.

In step S805, the valid flag 604 for the transfer setting is turned OFF. Consequently, this can prevent execution of waste processing of, with the transfer setting left in the valid state although the destination information does not exist, attempting to acquire the destination information each time when image data satisfying the transfer condition is received.

On the other hand, if no response is received from the server 102 to the destination information acquisition request from the MFP 101 or a server-busy response is received, the failure of the acquisition of the destination is considered to originate from a communication error with the server 102 (TRANSMISSION ERROR in step S804), and then, the procedure proceeds to step S806. In this case, processing of invalidating the transfer setting in step S805 is not executed.

In step S806, the CPU 211 determines whether any unprocessed transfer setting exists in transfer settings managed in the transfer setting management table 600 while the valid flag 604 is ON. As a result of the determination, if any unprocessed transfer setting exits (YES in step S806), the procedure returns to step S801, and the CPU 211 picks up a next transfer setting. On the other hand, if there exists no unprocessed transfer setting (NO in step S806), the procedure is terminated.

According to the above-described processing, determination of whether the destination information can be acquired is executed prior to receiving the image data (irrespective of receiving of the image data) so that, when the image data is received, the possibility that the acquisition of the destination information may fail can be reduced. If the acquisition of the destination information fails, whether the transfer setting will be invalidated or not can be changed according to the cause for the failure of the acquisition.

The flowcharts illustrated in FIGS. 7 and 8 describe an example in which as long as the cause for the failure of the acquisition of the destination information is a communication error, the transfer setting is not invalidated. In this respect, a following configuration is available. If the communication error continues beyond a predetermined number of times or a predetermined period, it can be determined that a state disabling the acquisition of the destination information is not temporary, and the transfer setting may be invalidated (turn OFF the valid flag 604).

When the transfer setting is invalidated in step S709 in FIG. 7 or step S805 in FIG. 8, the destination ID stored in the transfer destination 603 of the transfer setting management table 600 is deleted. After that, when the user selects a new transfer destination (i.e., a new destination ID is set), he or she can change the valid flag 604 from OFF to ON to reregister the transfer destination as a valid transfer setting.

FIG. 9 is a flowchart illustrating a series of operations to be executed when the MFP 101 changes the valid flag 604 for a transfer setting from OFF to ON (changes the transfer setting from an invalid status to a valid status). Each operation (step) illustrated in the flowchart in FIG. 9 is achieved when the CPU 211 of the MFP 101 executes a control program stored in the HDD 214. The processing illustrated in the flowchart in FIG. 9 is started when a user selects a transfer setting for which the valid flag 604 is OFF and instructs the MFP 101 to turn ON the valid flag.

In step S901, the CPU 211 acquires destination information corresponding to a relevant destination ID using the destination ID contained in the transfer setting. If the corresponding destination information is managed in the destination information management table 400, the MFP 101 acquires the destination information by communicating with the server 102 via the LAN 110.

In step S902, the CPU 211 determines whether the acquisition of the destination information in step S901 is successful. As a result of the determination, if the acquisition of the destination information is successful (YES in step S902), the procedure proceeds to step S903. If the acquisition of the destination information fails (NO in step S902), the procedure proceeds to step S904.

If the HDD 214 of the MFP 101 stores the destination information corresponding to the destination ID contained in the transfer setting, it is permissible to refrain from starting the flowchart in FIG. 9. This is appropriate in embodiments where the MFP 101 is adapted to, when the destination information is deleted from the destination information management table stored in the HDD 214, automatically invalidate the transfer setting including the destination ID corresponding to the deleted destination information.

Due to this function, if the HDD 214 in the MFP 101 stores the destination information corresponding to the destination ID contained in the transfer setting, the acquisition of the destination information never fails.

In step S903, the CPU 211 changes the valid flag 604 of the transfer setting selected by user ON. Consequently, the transfer setting is changed to the valid status.

In step S904, a message for notifying user that the acquisition of the destination information fails is displayed on the operation unit 219. The reason is that if the transfer setting is turned to the valid status although the acquisition of the destination information is unsuccessful, when image data is transferred, the acquisition of the destination information may be unsuccessful and causes an error. If the acquisition of the destination information in step S901 fails, the CPU 211 prompts the user to confirm the failure without turning ON the valid flag 604 for the transfer setting.

According to the flowcharts illustrated in FIGS. 7 and 8, different processing is executed according to the cause for the failure of the acquisition of the destination information. On the other hand, according to the flowchart illustrated in FIG. 9, the same processing (step S904) is executed irrespective of the cause for the failure of the acquisition of the destination information.

The reason is that, while the user does not always operate the MFP 101 when executing the flowcharts illustrated in FIGS. 7 and 8, evidently he or she operates the MFP 101 when executing the flowchart illustrated in FIG. 9. More specifically, if the user operates the MFP 101, he or she can confirm that a specified transfer destination is mistaken when informed of a failure of the acquisition of the destination information irrespective of the cause for the failure.

Aspects of the present invention can also be realized by a computer of a system or apparatus (or devices such as a CPU or a micro processing unit (MPU)) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

It will be understood that the present invention has been described above purely by way of example, and modification of detail can be made within the scope of the invention. Each feature disclosed in the description, and (where appropriate) the claims and drawings may be provided independently or in any appropriate combination.

This application claims priority from Japanese Patent Application No. 2010-215664 filed Sep. 27, 2010, which is hereby incorporated by reference herein in its entirety.

What is claimed is:

1. An image processing apparatus capable of communicating with an external apparatus via a network, the image processing apparatus comprising:
   a receiving unit configured to receive image data;
   a registering unit configured to register a transfer setting containing an identification (ID) for identifying destination information stored in the external apparatus to transfer the image data received by the receiving unit;
   an acquisition unit configured to acquire, via the network from the external apparatus, the destination information corresponding to the ID contained in the transfer setting registered by the registering unit;
   a transfer unit configured to transfer the image data received by the receiving unit using the destination information acquired by the acquisition unit; and
   a control unit configured to invalidate the transfer setting registered by the registering unit in a case where the acquisition unit cannot acquire the destination information due to a fact that the destination information corresponding to the ID is not stored in the external apparatus, wherein the control unit does not invalidate the transfer setting registered by the registering unit in a case where the acquisition unit cannot acquire the destination information due to a communication error with the external apparatus, wherein at least one of the receiving unit, the registering unit, the acquisition unit, the transfer unit, and the control unit is implemented by a processor and a memory.

2. The image processing apparatus according to claim 1, wherein the acquisition unit acquires, via the network form the external apparatus, the destination information in response to receiving the image data by the receiving unit.

3. The image processing apparatus according to claim 1, wherein the acquisition unit and the control unit are operable independently of the receiving unit, the registering unit, and the transfer unit so as to confirm whether the acquisition unit is capable of acquiring destination information corresponding to a given ID prior to receiving of the image data by the receiving unit.

4. The image processing apparatus according to claim 1, further comprising a deletion unit configured to delete the ID contained in the transfer setting if the control unit invalidates the transfer setting.

5. The image processing apparatus according to claim 1, wherein the transfer setting invalidated by the control unit can be reregistered in the registering unit as a valid transfer setting by specifying a new ID.

6. A method for controlling an image processing apparatus capable of communicating with an external apparatus via a network, the method comprising:

receiving image data;

registering a transfer setting containing an identification (ID) for identifying destination information stored in the external apparatus to transfer the received image data;

acquiring, via the network from the external apparatus, the destination information corresponding to the ID contained in the registered transfer setting;

transferring the received image data using the acquired destination information; and invalidating the registered transfer setting in a case where acquiring cannot be acquire the destination information due to a fact that the destination information corresponding to the ID is not stored in the external apparatus, wherein invalidating includes not invalidating the registered transfer setting in a case where acquiring cannot acquire the destination information due to a communication error with the external apparatus.

7. The method according to claim 6, further comprising receiving image data and transferring the image data according to the acquired destination information.

8. A non-transitory computer-readable storage medium storing a program to cause a computer to perform a method for controlling an image processing apparatus capable of communicating with an external apparatus via a network, the method comprising:

receiving image data;

registering a transfer setting containing an identification (ID) for identifying destination information stored in the external apparatus to transfer the received image data;

acquiring, via the network from the external apparatus, the destination information corresponding to the ID contained in the registered transfer setting;

transferring the received image data using the acquired destination information; and invalidating the registered transfer setting in a case where acquiring cannot acquire the destination information due to a fact that the destination information corresponding to the ID is not stored in the external apparatus, wherein invalidating includes not invalidating the registered transfer setting in a case where acquiring cannot acquire the destination information due to a communication error with the external apparatus.

9. An image processing apparatus capable of communicating with an external apparatus via a network, the image processing apparatus comprising:

a receiving unit configured to receive image data;

a registering unit configured to register a transfer setting containing an identification (ID) for identifying destination information stored in the external apparatus to transfer the image data received by the receiving unit;

an acquisition unit configured to acquire, via the network from the external apparatus, the destination information corresponding to the ID contained in the transfer setting registered by the registering unit;

a transfer unit configured to transfer the image data received by the receiving unit using the destination information acquired by the acquisition unit; and a control unit configured to invalidate the transfer setting registered by the registering unit in a case where the acquisition unit cannot acquire the destination information due to a fact that the destination information corresponding to the ID is not stored in the external apparatus, wherein the acquisition unit performs again a process for acquiring the destination information corresponding to the ID contained in the transfer setting registered by the registering unit in a case where the acquisition unit cannot acquire the destination information due to a communication error with the external apparatus, wherein at least one of the receiving unit, the registering unit, the acquisition unit, the transfer unit, and the control unit is implemented by a processor and a memory.

10. The image processing apparatus according to claim 9, wherein the acquisition unit acquires, via the network form the external apparatus, the destination information in response to receiving the image data by the receiving unit.

11. The image processing apparatus according to claim 9, wherein the acquisition unit and the control unit are operable independently of the receiving unit, the registering unit, and the transfer unit so as to confirm whether the acquisition unit is capable of acquiring destination information corresponding to a given ID prior to receiving of the image data by the receiving unit.

12. The image processing apparatus according to claim 9, further comprising a deletion unit configured to delete the ID contained in the transfer setting if the control unit invalidates the transfer setting.

13. The image processing apparatus according to claim 9, wherein the transfer setting invalidated by the control unit can be reregistered in the registering unit as a valid transfer setting by specifying a new ID.

* * * * *